Patented Dec. 10, 1940

2,224,595

UNITED STATES PATENT OFFICE 2,224,595

METHOD FOR PRODUCING CUTTING TOOLS

Walther Dawihl, Berlin-Kohlhasenbruck, and Karl Schröter, Berlin, Germany, assignors to General Electric Company, a corporation of New York No Drawing. Application March 11, 1939, Serial No. 261,388. In Germany March 18, 1938

8 Claims. (Cl. 75—137)

Our invention relates to an improved method for producing cutting tools.

A method for the manufacture of cutting tools for glass and the like is already known in which a pressed body consisting of finely divided crystalline aluminum oxide and a small quantity of a softer and ductile additional material is sintered at a temperature exceeding the melting temperature of the additional material.

According to another proposal this method can be made use of with good success also for the manufacture of cutting tools for working carbon, insulating materials of all kinds and even also steel, provided that the proportion of the metallic or oxidic additional material admixed to the finely divided crystalline aluminum oxide is so increased that the finished cutting tool produced by pressing and sintering contains from 20 to 40% of the softer and ductile additional material. In order to impart to the cutting tools a sufficient mechanical strength, the said pressed bodies prepared from the starting mixture have to be sintered at comparatively high temperature, viz. at 1700° C. and more.

Now the inventors have found that a lowering of the sinter temperature and thereby a more economical production of the cutting tools referred to is obtained by admixing to the mixture of finely divided crystalline aluminum oxide and from 20 to 40% of a softer ductile metallic additional material or a corresponding additional oxidic material further oxides or oxide compounds such for example as silicic acid, calcium oxide, kaolin, porcelain powder and the like, in quantities of up to 10%. For example, the sinter temperature of a mixture consisting of 80 parts finely divided crystalline aluminum oxide and 20 parts iron powder is lowered, by addition of 4 parts powdered porcelain or of a mixture of 5 parts calcium oxide and 1 part quartz powder, from 1750° C. to 1500° C. Surprisingly we have stated, further, that by such additions even an increase of the cutting capacity of the tools manufactured from the mass is obtained, for example in cutting insulating material.

In case that iron should be used as softer additional material we have found advantageous in order to increase the running time of tools manufactured from the mass prepared according to the invention, to add to the iron further small quantities, say from 0.1 to 5%, of at least one of the metals improving the resistance to wear of the iron, such for example as chromium, vanadium, titanium, cobalt, or nickel.

What we claim and desire to secure by Letters Patent is:

1. The method of lowering the sintering temperature of cutting tools consisting of finely divided crystallized aluminum oxide and from 20 to 40% of a softer ductile metallic material or a corresponding oxidic material which during sintering forms a softer ductile metallic material, said method comprising adding to a mixture of said finely divided aluminum oxide and said material an appreciable quantity but not more than 10% of one or more oxides or oxide compounds capable of materially lowering the sintering temperature of said mixture of aluminum oxide and material, pressing the resulting mixture into a desired shape and sintering it.

2. The method of lowering the sintering temperature of cutting tools consisting of finely divided crystallized aluminum oxide and from 20 to 40% of a softer ductile metallic material or a corresponding oxidic material which during sintering forms a softer ductile metallic material, said method comprising adding to a mixture of said finely divided aluminum oxide and said material an appreciable quantity but not more than 10% of one or more oxides or oxide compounds from the group silicic acid, calcium oxide, kaolin and porcelain powder, pressing the resulting mixture into a desired shape and sintering it.

3. The method for lowering the sintering temperature of cutting tools consisting of aluminum oxide and 20 to 40% iron metal, said method consisting of adding to a mixture of finely divided crystalline aluminum oxide and 20 to 40% iron an appreciable quantity but not more than 10% of one or more oxides or oxide compounds capable of lowering the sintering temperature of said cutting tool mixture.

4. The method for lowering the sintering temperature of cutting tools consisting of aluminum oxide and 20 to 40% of iron, which comprises substituting for a portion of the iron 0.1 to 5% of metal adapted to improve the resistance to wear of said iron, adding an appreciable quantity and up to 10% of oxides or oxide compounds capable of materially reducing the sintering temperature of said cutting tool composition, pressing the resulting mixture into a desired shape and sintering it.

5. The method for lowering the sintering temperature of cutting tools consisting of aluminum oxide and 20 to 40% of iron, which comprises substituting for a portion of said iron 0.1 to 5% of metal from the group chromium, vanadium, titanium, cobalt and nickel, adding an appreciable quantity and up to 10% of an oxide or oxide compound capable of materially reducing the sintering temperature of said cutting tool mixture, pressing the resulting mixture into a desired shape and sintering it.

6. The method for lowering the sintering temperature of cutting tools consisting of finely divided crystalline aluminum oxide and 20 to 40% of a softer ductile metallic material or a corresponding oxidic material which during sintering forms a softer ductile metallic material, said method comprising adding to a mixture of said finely divided crystalline aluminum oxide and material an appreciable quantity but not more than 10% of silicic acid, pressing the resulting mixture into a desired shape and sintering it.

7. The method for lowering the sintering temperature of cutting tools consisting of finely divided crystalline aluminum oxide and 20 to 40% of a softer ductile metallic material or a corresponding oxidic material which during sintering forms a softer ductile metallic material, said method comprising adding to a mixture of said finely divided crystalline aluminum oxide and material an appreciable quantity but not more than 10% of calcium oxide, pressing the resulting mixture into a desired shape and sintering it.

8. The method for lowering the sintering temperature of cutting tools consisting of finely divided crystalline aluminum oxide and 20 to 40% of a softer ductile metallic material or a corresponding oxidic material which during sintering forms a softer ductile metallic material, said method comprising adding to a mixture of said finely divided crystalline aluminum oxide and material an appreciable quantity but not more than 10% of porcelain powder, pressing the resulting mixture into a desired shape and sintering it.

WALTHER DAWIHL.
KARL SCHRÖTER.